United States Patent [19]

Muranaga et al.

[11] Patent Number: 4,967,371
[45] Date of Patent: Oct. 30, 1990

[54] METHOD AND APPARATUS FOR INFERENCE

[75] Inventors: Tetsuro Muranaga; Hideyuki Tsutsumitake, both of Yokohama, Japan

[73] Assignee: Kabushiki Kaisha Toshiba, Kawasaki, Japan

[21] Appl. No.: 272,400

[22] Filed: Nov. 17, 1988

[30] Foreign Application Priority Data

Nov. 20, 1987 [JP] Japan .................. 62-293455

[51] Int. Cl.⁵ .................. G09B 7/12; G06F 12/00; G06F 7/00
[52] U.S. Cl. .................. 364/513; 364/200; 364/900
[58] Field of Search .................. 364/513, 200, 900

[56] References Cited

U.S. PATENT DOCUMENTS

| | | | |
|---|---|---|---|
| 4,591,983 | 5/1986 | Bennett et al. | 364/403 |
| 4,648,044 | 3/1987 | Hardy et al. | 364/513 |
| 4,658,370 | 4/1987 | Erman et al. | 364/513 |
| 4,670,848 | 6/1987 | Schramm | 364/900 |
| 4,675,829 | 6/1987 | Clemenson | 364/513 |
| 4,803,642 | 2/1988 | Muranaga | 364/513 |
| 4,866,635 | 9/1989 | Kahn et al. | 364/513 |

*Primary Examiner*—Jerry Smith
*Assistant Examiner*—Jim Trammell
*Attorney, Agent, or Firm*—Foley & Lardner, Schwartz, Jeffery, Schwaab, Mack, Blumenthal & Evans

[57] ABSTRACT

A method of inference using frame-based knowledge representation which enable the simultaneous realization of high accuracy and high speed in the process of inference is disclosed. The method includes the steps of accompanying each slot with procedure information which indicates procedure for deriving the slot value of the slot from the other slot values, providing pointer information indicating the slots related to each other by the procedure indicated by the procedure information, accompanying each slot with sign information which indicates the validity of the slot value currently given, deriving the slot value in accordance with the procedure indicated by the procedure information when the slot value is missing and when the slot value is indicated by the accompanying sign information as invalid, changing the indication of the sign information accompanying the slots which are indicated by the pointer information as being related to the slot whose slot value is derived, and caching in the derived slot value. An apparatus for performing this method is also disclosed.

6 Claims, 11 Drawing Sheets ical that referencing takes place more often than changing in a course of inference.

As a solution to this problem, there is a proposition to-cache- in a derived slot value once it is referred to so that a derivation can be spared in the subsequent occasions of being referred to, and thereby to improve the speed of the inference process. However, such a proposition is troubled by the possibility that the slot value cached in at one time may not be appropriate when it is referred to again at some other time as other slot values utilized in deriving this slot value may have been changed in a intervening time between the two occasions of referencing.

Thus, in the prior art inference process, high-speed and accuracy were not simultaneously achievable.

SUMMARY OF THE INVENTION

It is therefore an object of the present invention to provide a method and an apparatus for inference capable of achieving both high-speed and accuracy in an inference process simultaneously.

According to one aspect of the present invention there is provided an apparatus for inference, comprising: knowledge base means containing frames comprised of: slots and slot values for storing knowledge on objects of interest, each object being represented by one of the frames, each categorized attribute being represented by one of the slots in the frame, a particular attribute value corresponding to the object being represented by one of the slot values in the frame; procedure information accompanying each slot which indicates procedure for deriving the slot value of the slot from the other slot values; pointer information for indicating the slots related to each other by the procedure indicated by the procedure information; and sign information accompanying each slot for indicating the validity of the slot value currently given; and knowledge base managing means for managing the knowledge base means including: means for deriving the slot value in accordance with the procedure indicated by the procedure information when the slot value is missing and when the slot value is indicated by the accompanying sign information as invalid; means for changing the indication of the sign information accompanying the slots which are indicated by the pointer information as being related to the slot whose slot value is derived by the deriving means; and means for caching in the slot value derived by the deriving means to the knowledge base means.

According to another aspect of the present invention there is provided a method of inference, comprising the steps of: (a) representing each object of interest by a frame in a knowledge base; (b) representing each categorized attribute and corresponding attribute value of an object by a slot and its slot value in the frame representing the object; (c) accompanying each slot with procedure information which indicates procedure for deriving the slot value of the slot from the other slot values; (d) providing pointer information for indicating the slots related to each other by the procedure indicated by the procedure information; (e) accompanying each slot with sign information for indicating the validity of the slot value currently given; (f) deriving the slot value in accordance with the procedure indicated by the procedure information when the slot value is missing and when the slot value is indicated by the accompanying sign procedure as invalid; (g) changing the indication of the sign information accompanying the slots which are indicated by the pointer information as being related to the slot whose slot value is derived at the step (f); and (h) caching in the slot value derived at the step (f) to the knowledge base.

Other features and advantages of the present invention will become apparent from the following description taken in conjunction with the accompanying drawings.

DETAILED DESCRIPTION OF THE PREFERRED EMBODIMENTS

Figure 1:
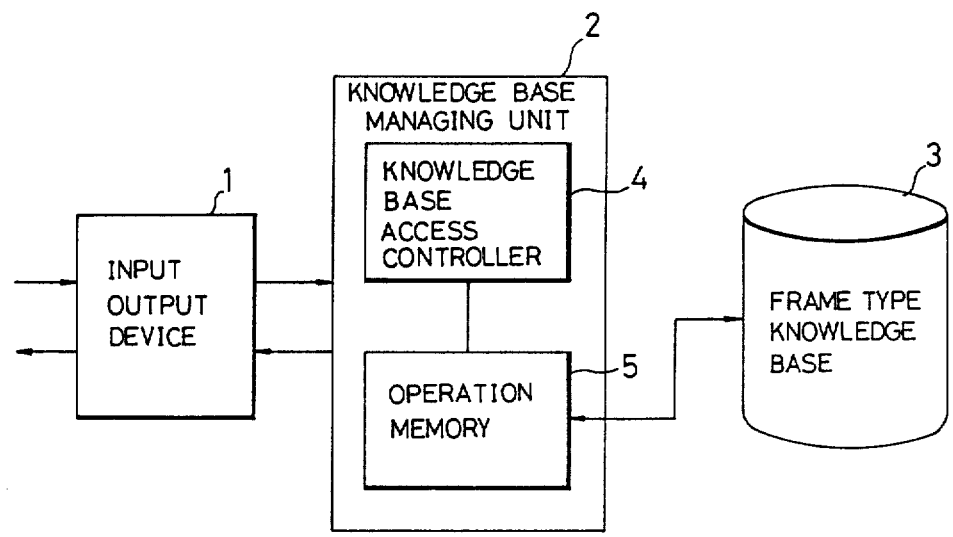
FIG. 1 is a block diagram of one embodiment of an apparatus for inference according to the present invention.

Referring now to FIG. 1, there is shown one embodiment of an apparatus for inference according to the present invention.

This apparatus comprises an input-output device 1, a knowledge base managing device 2, and a frame type knowledge base 3.

The input-output device 1 fulfills dual functions of an input device which allows an operator to enter commands for referring or changing of knowledge in the knowledge base 3, and an output device which shows results of the referring and the changing to the operator.

The knowledge base managing unit 2 recognizes the command entered at the input-output device 1, makes an access to the knowledge base 3 to carry out the command, and returns the results obtained by carrying out the command to the input-output device 1. This knowledge base managing unit 2 is comprised of a knowledge base access controller 4 which controls accesses to the knowledge base 3, and a operation memory 5 which memorizes frame patterns from the input-output device 1 and the knowledge base 3 in order to carry out operations required for inference such as a pattern matching.

Figure 2:
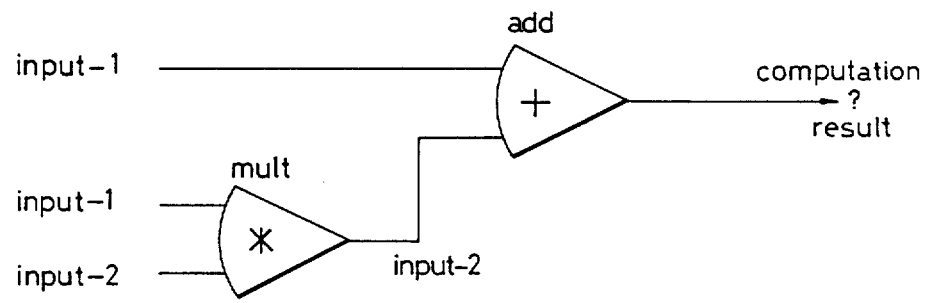
FIG. 2 is a diagram of a computation module which is represented in a knowledge base in examples used to explain operations of the apparatus for inference shown in FIG. 1.
Figure 3:
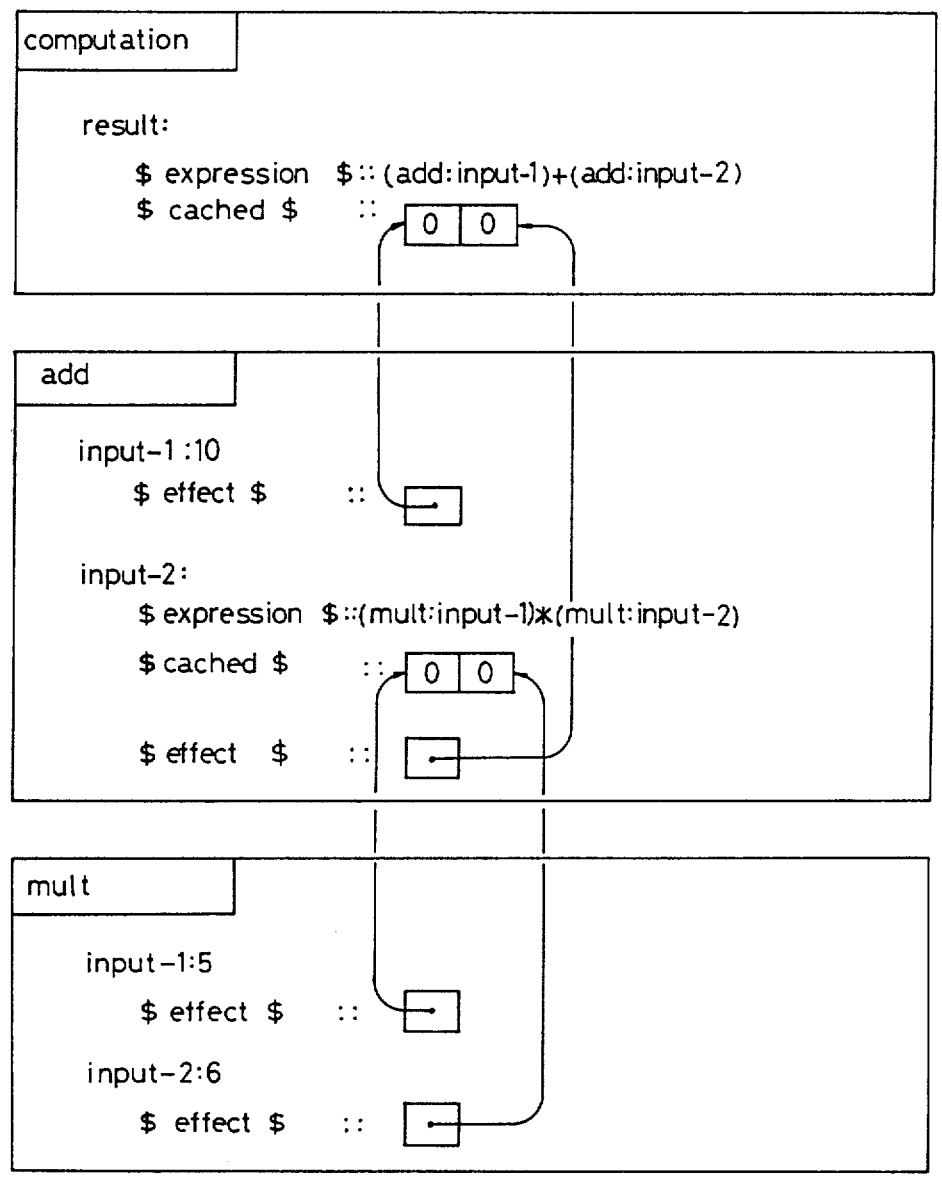
FIG. 3 is a diagrammatic illustration of the knowledge base representing the computation module shown in FIG. 2, according to one embodiment of the present invention.

The knowledge base 3 stores knowledge in forms of frames comprised of slot-slot value pairs. An example of such a knowledge in the knowledge base 3 which represents a computation module shown in FIG. 2, which is comprised of an adder and a multiplier, is shown in FIG. 3. In FIG. 3, each rectangular box stands for a frame with its name such as "computation", "add", or "mult" shown in the upper-left corner of each box. In each frame, a slot is shown as what appears to the left of the symbol ":", such as "result", "input-1", or "input-2", while a corresponding slot value is shown as what appears to the right of the symbol ":", such as "10", "5", or "6".

These slot-slot value pairs can be accompanied by various types of information which are represented by facet-facet value pairs shown as what appears to the left and the right, respectively, of the symbol "::". Thus, the facet value corresponding to the facet "$ expression $" in each frame represents a formula to be employed when the slot value being accompanied is missing. For instance, the facet value (mult:input-1)*(mult:input-2) indicates a multiplication of the slot value of the slot "input-1" in the frame "mult" and the slot value of the slot "input-2" in the frame "mult". For example, the slot value of the slot "result" in the frame "computation" can be derived as $(5*6)+10=40$ in accordance with the formula given in the facet "$ expression $" accompanying the slot "result". The mathematical formula appeared in the facet values in this example may be replaced by logical equations or programs.

In similar manners, the facet value corresponding to the facet "$ effect $" in each frame represents pointers which indicate slots that are going to be affected when the slot value being accompanied by the facet "$ effect $" is changed, while the facet value corresponding to the facet "$ cached $" in each frame represents flags which indicate whether any slot value referred to in deriving the slot value being accompanied by the facet "$ cached $" are changed. A flag shows "1" in a case when the corresponding slot has been changed, and "0" otherwise.

The operation of this apparatus for inference will now be explained.

Figure 4:
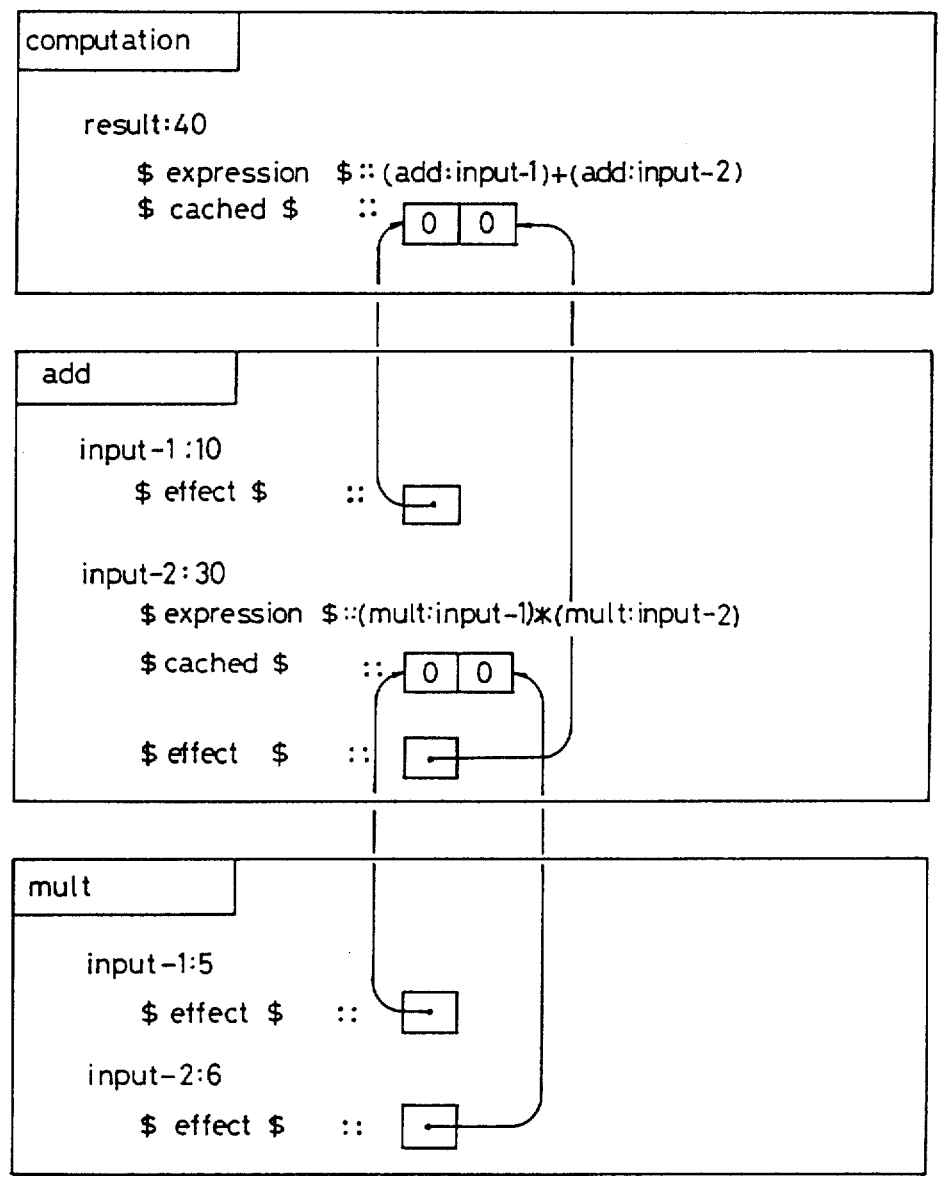
FIGS. 4 to 6 are diagrammatic illustrations of the knowledge base according to the embodiment shown in FIG. 3 for showing the states of the knowledge base resulting after the various operations of the apparatus for inference shown in FIG. 1 are performed.

As the command for referring the slot value of the slot "result" in the frame "computation" is given to the knowledge base managing unit 2 from the input-output device 1, the knowledge base access controller 4 refers through the operation memory 5 to the slot value of the slot "result" in the frame "computation" stored in the knowledge base 3. However, as shown in FIG. 3, there is no slot value given for that slot. Consequently, the facet "$ expression $" is referred, and in accordance with the facet value of this facet, the slot values of the slots "input-1" and "input-2" in the frame "add" are referred. But since the slot value for the slot "input-2" in the frame "add" is also missing, the facet "$ expression $" accompanying this slot "input-2" in the frame "add" is referred, and in accordance with the facet value of this facet, the missing slot values of the slot "input-2" in the frame "add" is derived as:

$$(mult:input-1)*(mult:input-2)=30$$

and this value is cached in the slot value of the slot "input-2" in the frame "add", so that the repetition of the derivation just explained of this slot value is unnecessary when it is referred to again. As a result, the slot value of the slot "result" in the frame "computation" can also be derived as:

$$(add:input-1)+(add:input-2)=40$$

and this value is also cached in the slot value of the slot "result" in the frame "computation". The state of the knowledge base 3 at this point therefore appears as shown in FIG. 4.

Figure 5:
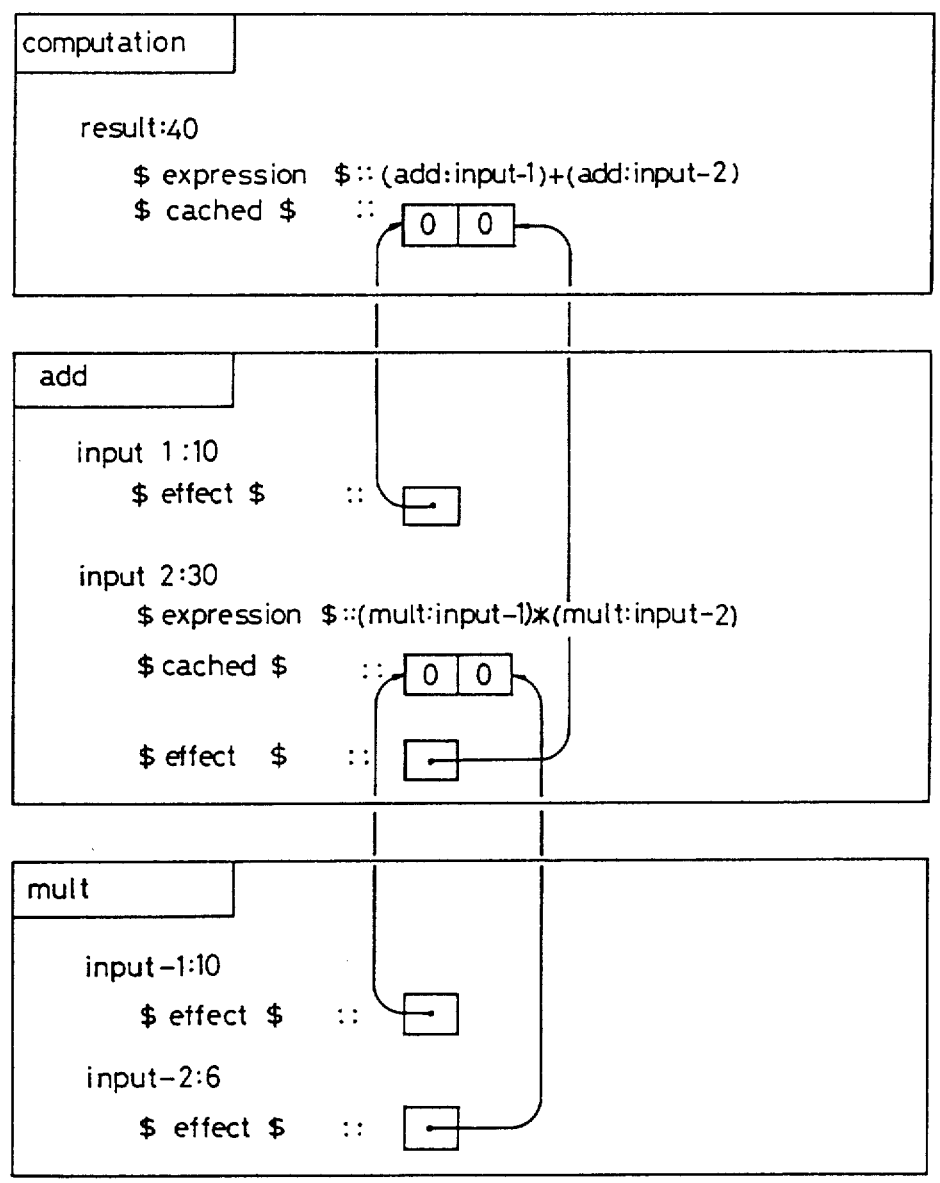

Now, if the slot value of the slot "input-1" in the frame "mult" is changed from "5" to "10", then the slot values of the slot "result" in the frame "computation" and of the slot "input-2" in the frame "add" derived and cached in as above are no longer valid. In this case, when the change of the slot value of the slot "input-1" in the frame "mult" is made, by means of the pointer in the facet "$ effect $" of the same slot, the slot "input-2" in the frame "add" which is influenced by this change is identified and the flag in the facet "$ cached $" of this slot is changed to indicate "1". Then, by means of the pointer in the facet "$ effect $" of this slot, the slot "result" in the frame "computation" which is also influenced by this change is identified and the flag in the facet "$ cached $" of this slot is also changed to indicate "1". As a result, the state of the knowledge base 3 at this point appears as shown in FIG. 5. In a similar manner, the tracking by means of the pointer in the facet "$ effect $" of each slot is performed for all the relevant pointers in this apparatus.

Figure 6:
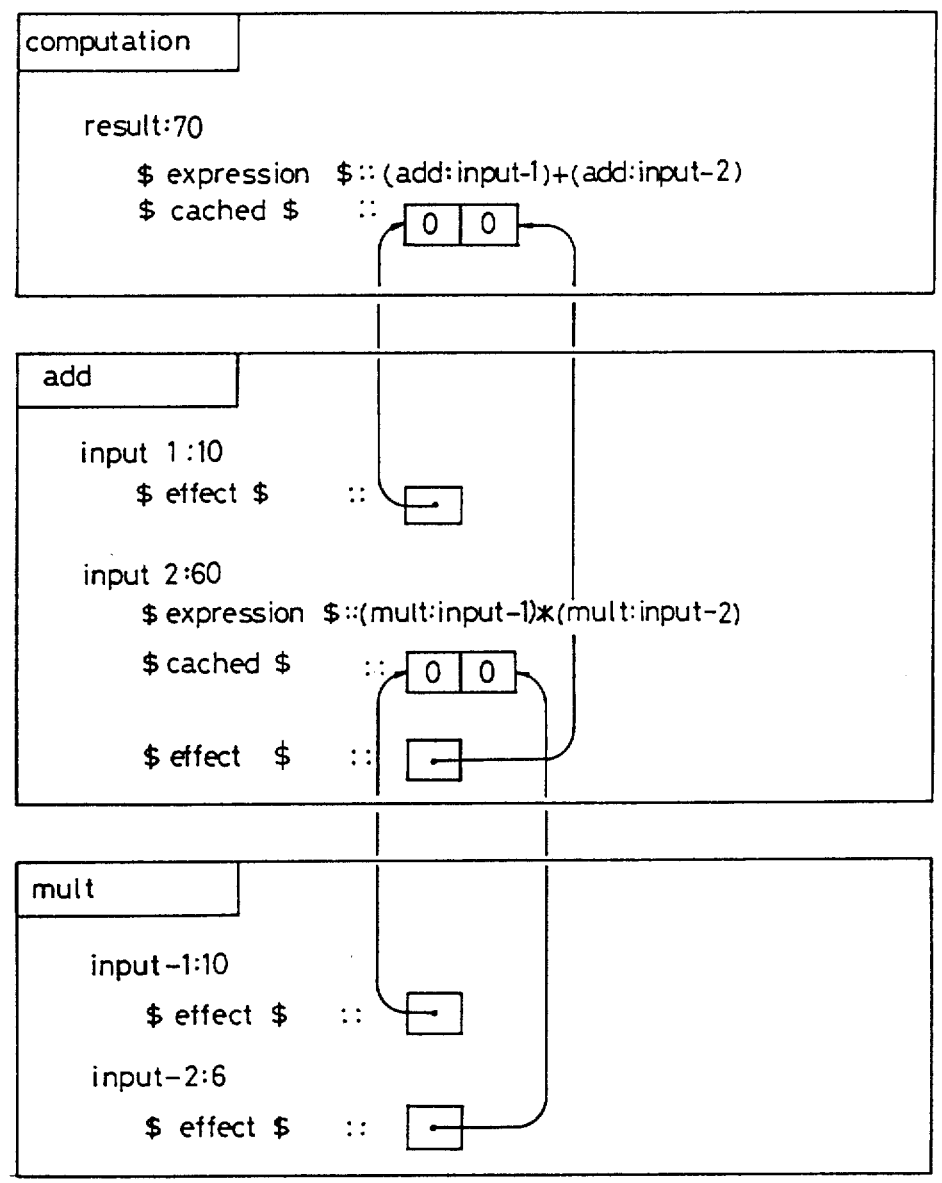

When the slot value of the slot "result" in the frame "computation" is referred to again, the knowledge base managing unit 2 recognizes that the slot value given there is not valid, by means of the flag "1" in the facet "$ cached $" of the slot "result", and accordingly the derivation of this slot value is carried out again. Then as the newly derived slot value is cached in, the flag in the facet "$ cached $" is changed to indicate "0". As a result, the state of the knowledge base 3 at this point appears as shown in FIG. 6, and the quick referring of the slot values becomes possible again in the subsequent operations.

Figure 7:
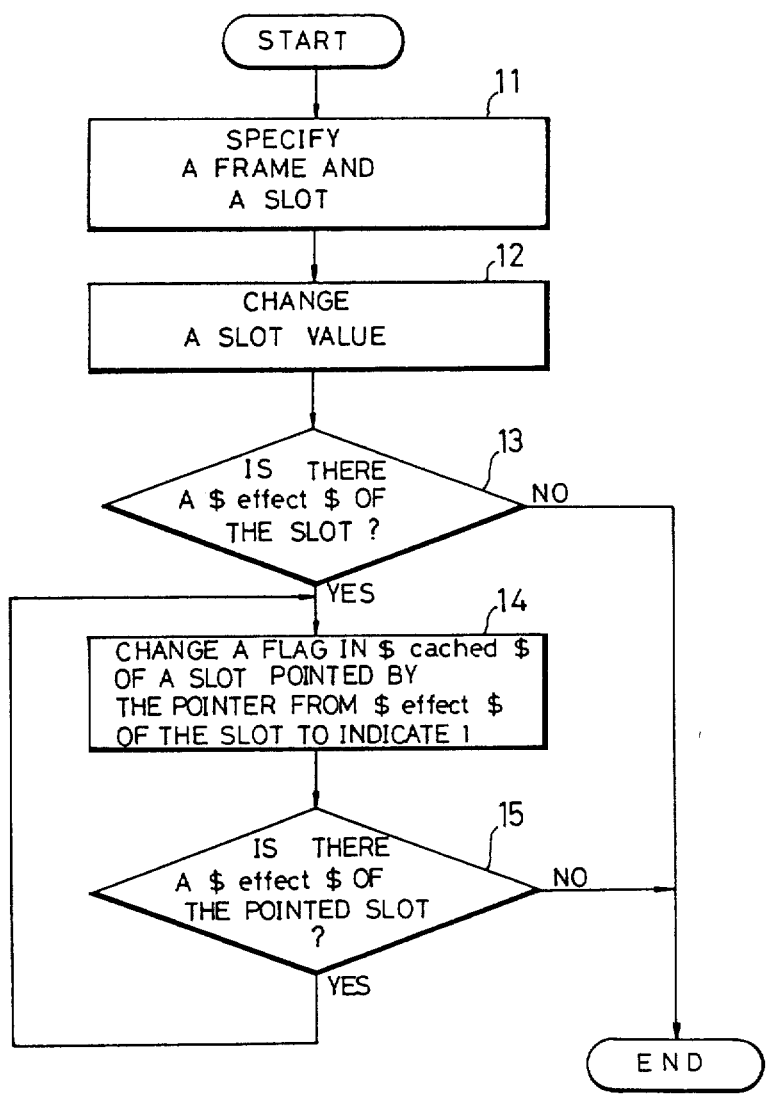
FIGS. 7 and 8 are flow charts for two operations performed by the apparatus for inference shown in FIG. 1, according to the embodiment shown in FIG. 3.
Figure 8:
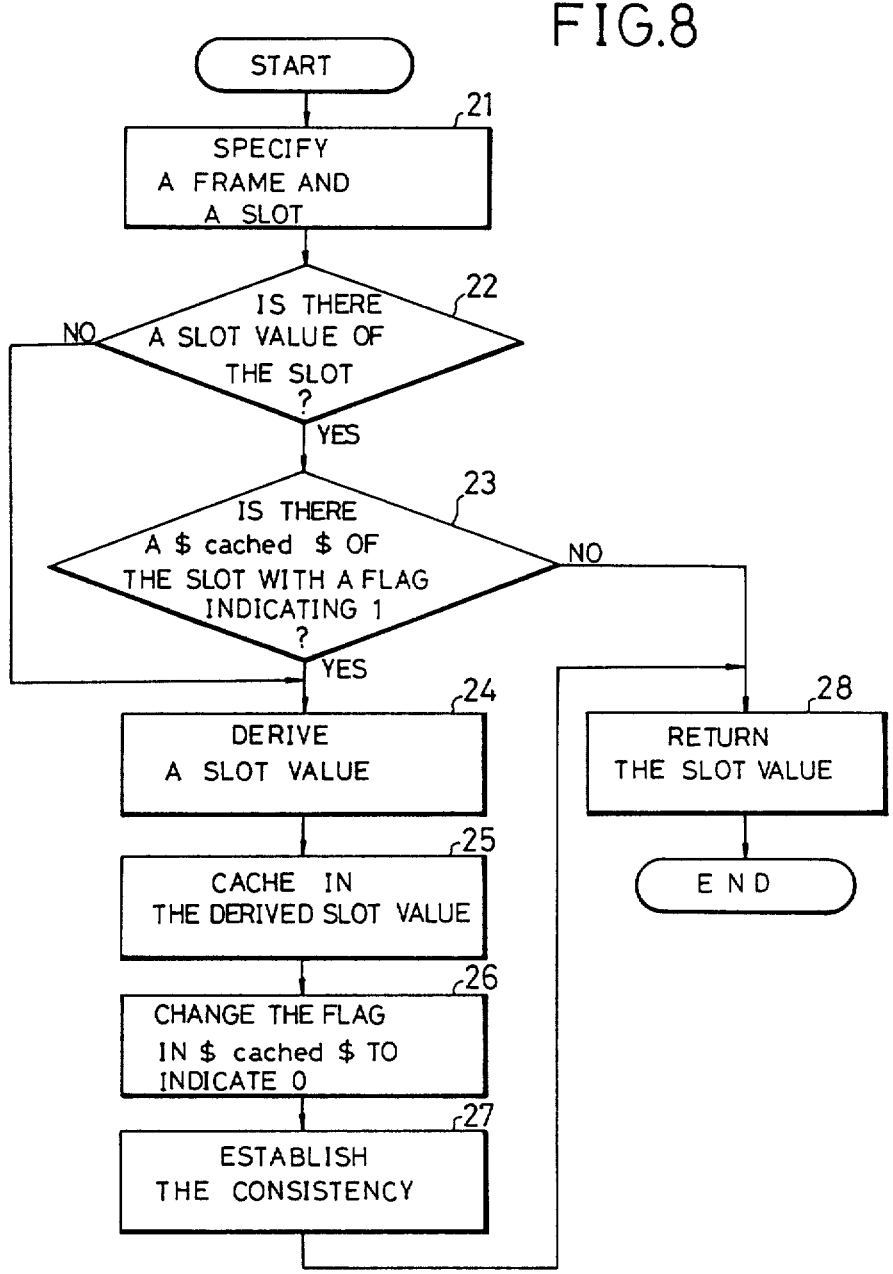

The procedures just explained for the cases of changing the slot value and of deriving the slot value are shown in the flow charts shown in FIGS. 7 and 8, respectively.

According to the flow chart for the change of the slot value shown in FIG. 7, the slot and the frame to which the slot value to be changed belongs are specified at the step 11, and the slot value is changed at the step 12 as was done in the above example for the slot value of the slot "input-1" in the frame "mult" which was changed from "5" to "10". Then, the presence of the facet "$ effect $" of this slot is detected at the step 13. If there is no facet "$ effect $" of this slot, the process terminates. Otherwise, the process proceeds to the step 14 at which the flag in the facet "$ cached $" of the slot identified by means of the pointer in that facet "$ effect $" is changed to indicate "1", as was done in the above example for the flag in the facet "$ cached $" of the slot "input-2" in the frame "add". Then, at the step 15, the presence of the facet "$ effect $" of this slot whose facet "$ cached $" has the flag "1" as its facet value is detected. As in the step 13, if there is no facet "$ effect $" of this slot, the process terminates. Otherwise, the steps 14 and 15 are repeated, as was done in the above example for the slot "result" in the frame "computation".

According to the flow chart for the derivation of the slot value shown in FIG. 8, the slot and the frame to which the slot value to be derived belongs are specified at the step 21, and the presence of the slot value for that slot in that frame is detected at the step 22. If the slot value is not present, the slot value is derived in accordance with the direction given in the facet "$ expression $" at the step 24. On the other hand, if the slot value is already present, whether this slot value is valid or not is determined at the step 23 according to whether the flag in the facet "$ cached $" of that slot is "1" or "0". If the flag in the facet "$ cached $" of the slot is "0", the slot value given is considered valid and this slot value is returned as it is at the step 28. If the flag in the facet "$ cached $" of the slot is "1", the slot value given is considered invalid and the process proceeds to the step 24 at which the slot value is derived as explained above. After the slot value is derived at the step 24, this newly derived slot value is cached in at the step 25, and the flag in the facet "$ cached $" of this slot is changed to indicate "0" at the step 26. Then, as the slot value is changed at the step 24, the process shown in FIG. 7 is carried out at the step 27 in order to establish the consistency in the knowledge base 3, and the derived slot value is returned at the step 28.

As explained, according to this embodiment, the validity of the slot value is determined by consulting the flag in the facet "$ cached $" of the slot, and after each change of the slot value the consistency in the knowledge base 3 is established so that the high-speed operation can be ensured between the successive changes, and therefore the accuracy and the speed of the operation can be maintained at high levels simultaneously.

It is to be noted that although the flag in the above embodiment is provided for each pointer, the number of the flag may be limited to one for each facet "$ cached $".

Figure 9:
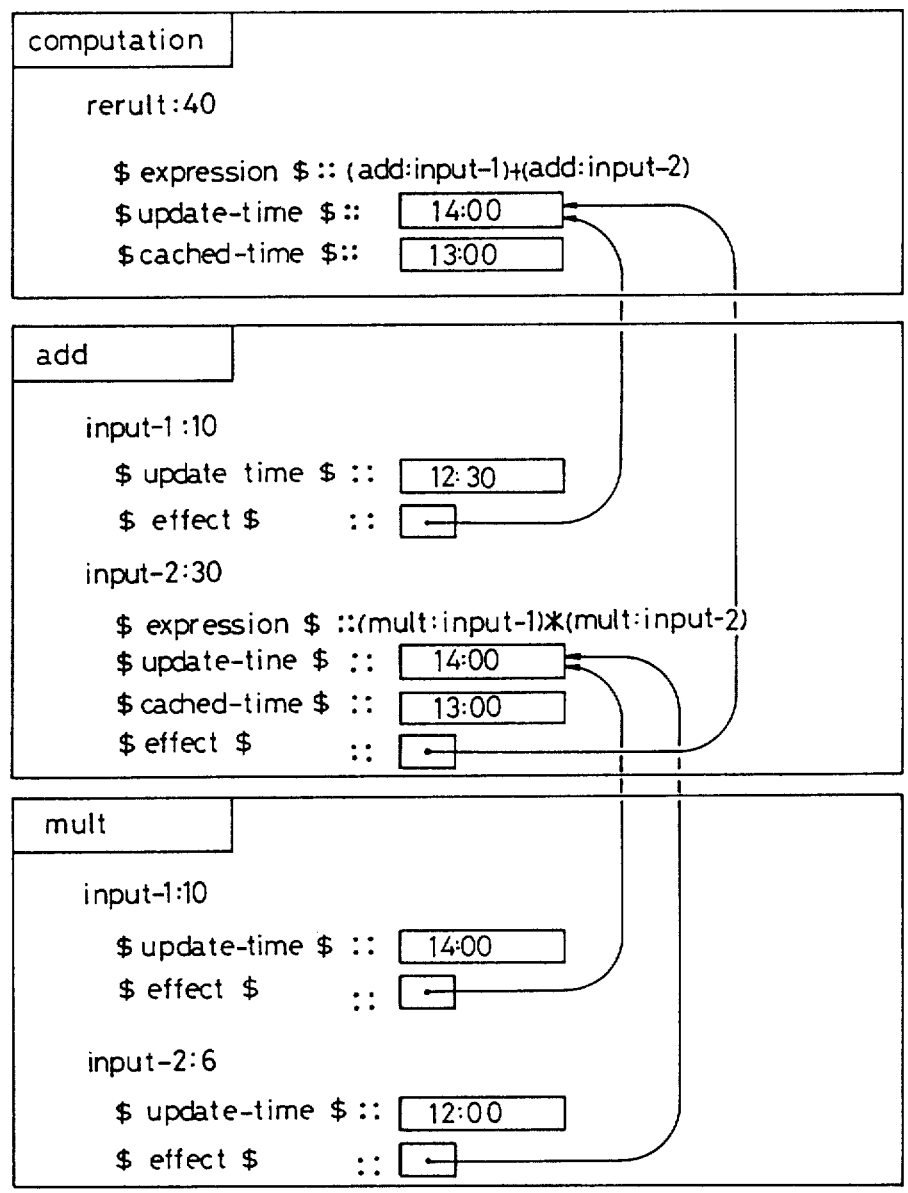
FIG. 9 is a diagrammatic illustration of the knowledge base representing the computation module shown in FIG. 2, according to another embodiment of the present invention.

Referring now to FIG. 9, another embodiment of the present invention will be explained. In this second embodiment the apparatus to be used is identical to that of the previous embodiment shown in FIG. 1.

As shown in FIG. 9, in this embodiment the flag in the facet "$ cached $" of the previous embodiment is replaced by the time of the change indicated in the facet "$ update-time $" and the time of caching in indicated in the facet "$ cached-time $".

Figure 10:
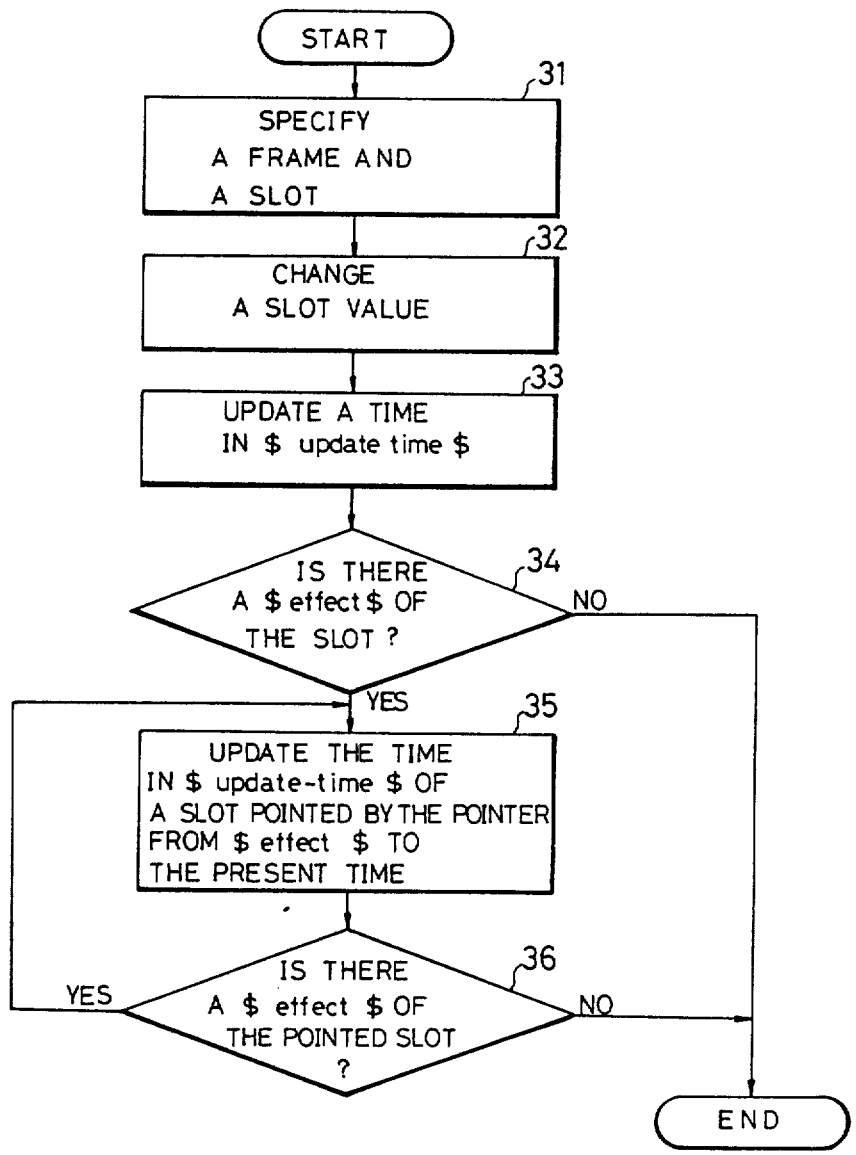
FIGS. 10 and 11 are flow charts for two operations performed by the apparatus for inference shown in FIG. 1, according to the embodiment shown in FIG. 9.
Figure 11:
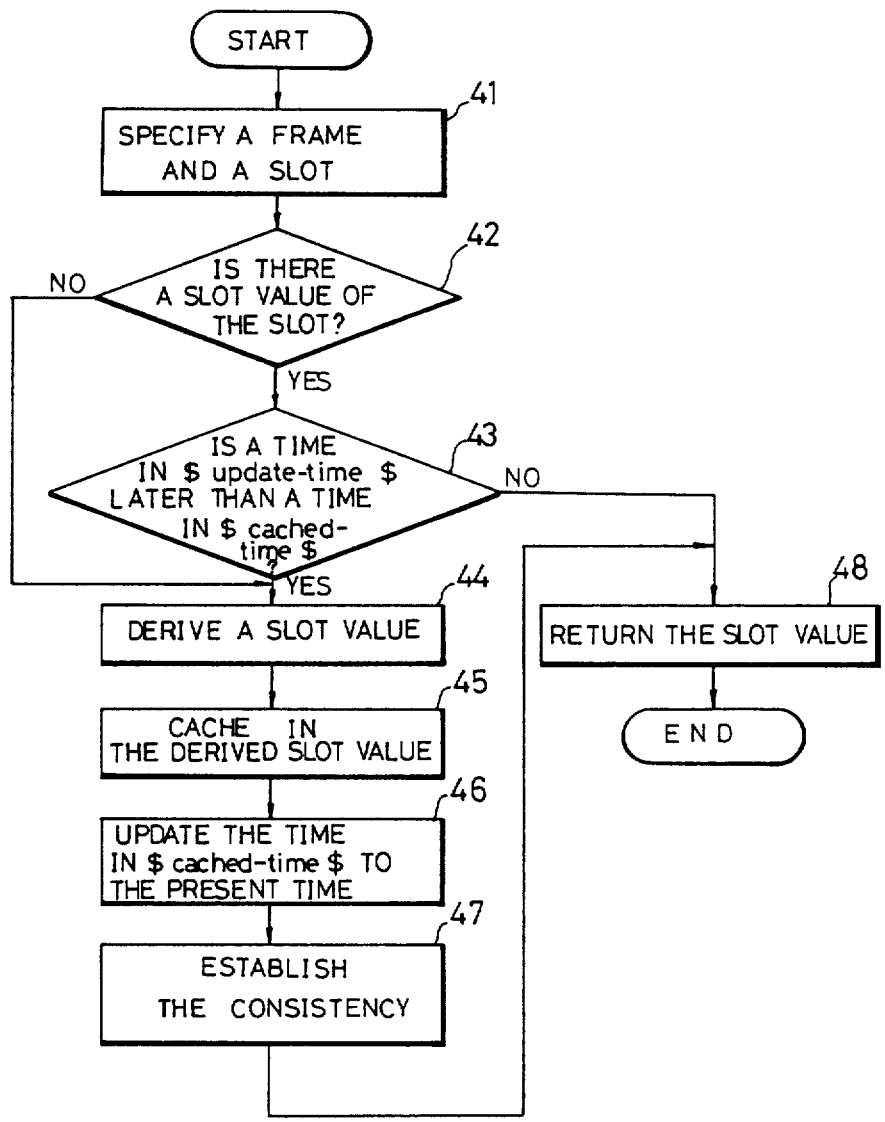

The procedures for the change and the derivation of the slot value in this embodiment are shown in FIGS. 10 and 11, respectively.

According to the flow chart for the change of the slot value shown in FIG. 10, the slot and the frame to which the slot value to be changed belongs are specified at the step 31, and the slot value is changed at the step 32. In the example shown in FIG. 9, the slot value of the slot "input-1" in the frame "mult" is changed from "5" to "10". Meanwhile, the time indicated in the facet "$ update-time $" is updated to the present time at the step 33. In the example shown in FIG. 9, the facet value of the facet "$ update-time $" of the slot "input-1" in the frame "mult" is updated to "14:00". Then, the presence of the facet "$ effect $" of this slot is detected at the step 34. If there is no facet "$ effect $" of this slot, the process terminates. Otherwise, the process proceeds to the step 35 at which the time in the facet "$ update-time $" of the slot identified by means of the pointer in that facet "$ effect $" is updated to the present time. In the example shown in FIG. 9, the time in the facet "$ update-time $" of the slot "input-2" in the frame "add" is updated to "14:00". Then, at the step 36, the presence of the facet "$ effect $" of this slot whose facet "$ update-time $" has been updated is detected. As in the step 34, if there is no facet "$ effect $" of this slot, the process terminates. Otherwise, the steps 35 and 36 are repeated. In the example shown in FIG. 9, the time in the facet "$ update-time $" of the slot "result" in the frame "computation" is updated to "14:00".

According to the flow chart for the derivation of the slot value shown in FIG. 11, the slot and the frame to which the slot value to be derived belong are specified at the step 41, and the presence of the slot value for that slot in that frame is detected at the step 42. If the slot value is not present, the slot value is derived in accordance with the direction given in the facet "$ expression $" at the step 44. On the other hand, if the slot value is already present, whether this slot value is valid or not is determined at the step 43 according to whether the time in the facet "$ update-time $" of that slot is later than the time in the facet "$ cached-time $" of that slot. If the flag in the facet "$ update-time $" of the slot is not later than the time in the facet "$ cached-time $" of that slot, the slot value given is considered valid and this slot value is returned as it is at the step 48. If the time in the facet "$ update-time $" of the slot is later than the time in the facet "$ cached-time $" of that slot, the slot value given is considered invalid and the process proceeds to the step 44 at which the slot value is derived as explained above. After the slot value is derived at the step 44, this newly derived slot value is cached in at the step 45, and the time in the facet "$ cached-time $" of this slot is updated to the present time at the step 46. Then, as the slot value is changed at the step 44, the process shown in FIG. 10 is carried out at the step 47 in order to establish the consistency in the knowledge base 3, and the derived slot value is returned at the step 48.

As explained, according to this second embodiment, the validity of the slot value is determined by consulting the time in the facet "$ update-time $" of the slot, and after each change of the slot value the consistency in the knowledge base 3 is established so that the high-speed operation can be ensured between the successive changes, and therefore the accuracy and the speed of the operation can be maintained at high levels simultaneously.

In these two embodiment explained above, the information specifying the related slots necessary in deriving the slot value which was given in the form of pointers in the examples used above is given as the facet value of the facet "$ effect $". This information must be entered in the knowledge base 3 before the referring takes place. The process of entering this information in the knowledge base 3 by the knowledge base managing unit 2 is shown in FIG. 12.

Figure 12:
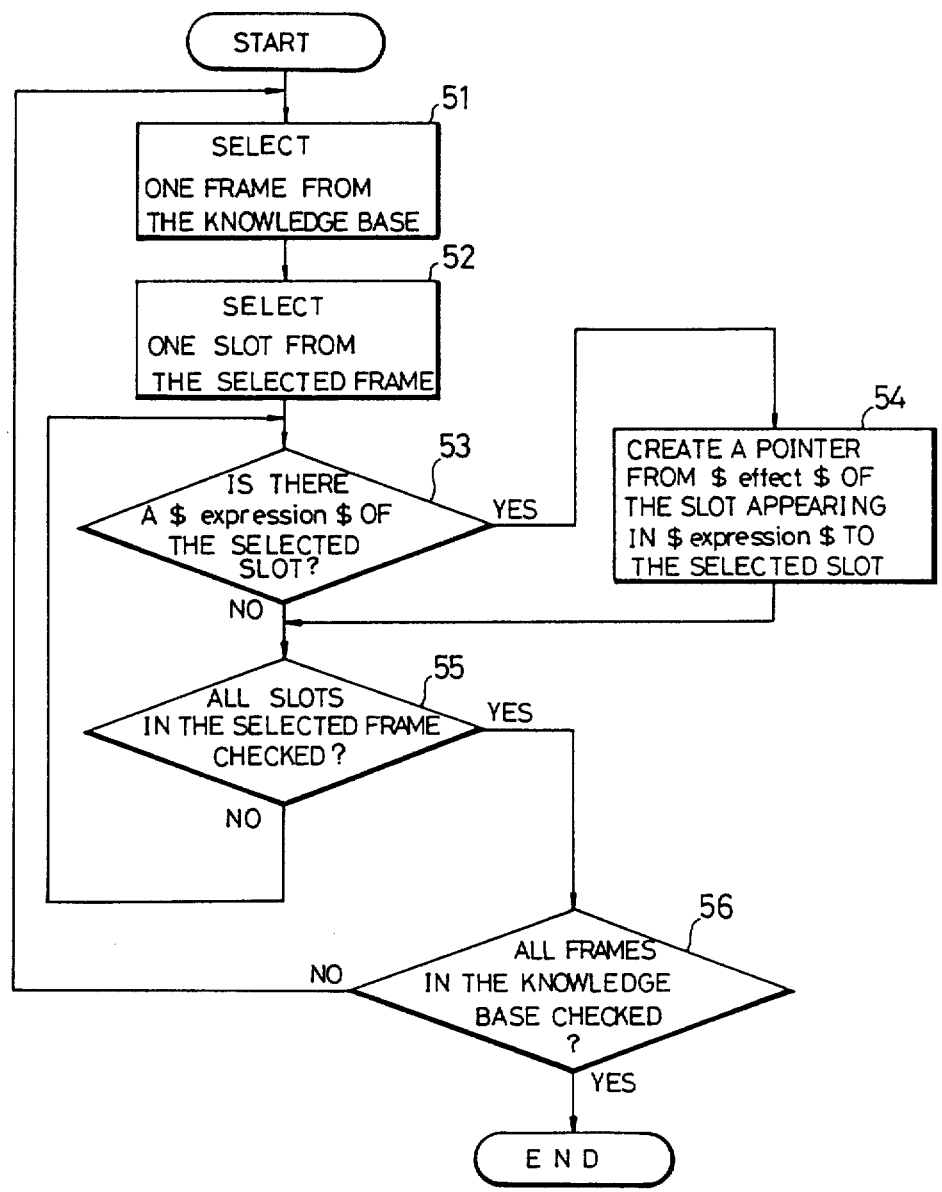
FIG. 12 a flow chart for one operation performed by the apparatus for inference shown in FIG. 1.

According to the flow chart shown in FIG. 12, one frame in the knowledge base 3 is selected at the step 51, and one slot in the selected frame is selected at the step 52. Then the presence of the facet "$ expression $" of the selected slot is detected at the step 53. If the facet "$ expression $" of the selected slot is present, the pointer is created which points from the facet "$ effect $" of the slot appearing in the formula given in the facet "$ expression $" to the selected slot at the step 54 and the process proceeds to the step 55. If the facet "$ expression $" of the selected slot is not present, the step 54 is skipped and the process directly proceeds to the step 55. The steps 55 and 56 make sure that these process is repeated until all the slots in all the frames are checked. By this process, the pointers can be entered in the knowledge base 3 automatically.

It is to be noted that many modifications and variations of these embodiment may be made without departing from the novel and advantageous features of the present invention. Accordingly, all such modifications and variations are intended to be included within the scope of the appended claims.

What is claimed is:

1. An apparatus for inference, comprising:
   knowledge base means containing frames comprised of:
   slots and slot values for storing knowledge on objects of interest and representing categorized attributes, each object being represented by one of the frames, each categorized attribute being represented by one of the slots in the frame, a particular attribute value corresponding to the object being represented by one of the slot values in the frame;
   procedure information accompanying each slot which indicates a procedure for deriving a slot value of a slot from other slot values;
   pointer information for indicating the slots related to each other by the procedure indicated by the procedure information; and
   sign information accompanying each slot for indicating validity of the slot value currently given; and
   knowledge base managing means for managing the knowledge base means including:
   means for deriving a slot value in accordance with the procedure indicated by the procedure information when the slot value is missing and when the slot value is indicated by the accompanying sign information as invalid;
   means for changing the indication of the sign information accompanying the slots which are indicated by the pointer information as being related to the slot whose slot value is derived by the deriving means; and
   means for caching in the slot value derived by the deriving means to the knowledge base means.

2. The apparatus of claim 1, wherein the sign information is a flag which carries different symbols to indicate the validity of the slot value.

3. The apparatus of claim 1, wherein the sign information is comprised of a first information concerning a time at which the slot value is derived by the deriving means, and a second information concerning a time at which the slot value is cached in by the caching means, and wherein the validity of the slot value is indicated by the time in the first information being later than the time in the second information.

4. A method of inference, comprising the steps of:
   (a) representing objects of interest, each object of interest represented by a frame in a knowledge base;
   (b) representing categorized attributes, each categorized attribute and corresponding attribute value of an object represented by a slot and its slot value in the frame representing the object of interest;
   (c) accompanying each slot with procedure information which indicates procedure for deriving the slot value of the slot from other slot values;
   (d) providing pointer information for indicating the slots related to each other by the procedure indicated by the procedure information;
   (e) accompanying each slot with sign information for indicating validity of the slot value currently given;
   (f) deriving the slot value in accordance with the procedure indicated by the procedure information when the slot value is missing and when the slot value is indicated by the accompanying sign information as invalid;
   (g) changing the indication of the sign information accompanying the slots which are indicated by the pointer information as being related to the slot whose slot value is derived at the step (f); and (h) caching in the slot value derived at the step (f) to the knowledge base.

5. The method of claim 4, wherein the sign information is a flag which carries different symbols to indicate the validity of the slot value.

6. The method of claim 4, wherein the sign information is comprised of a first information concerning a time at which the slot value is derived at the step (f), and a second information concerning a time at which the slot value is cached in at the step (h), and wherein the validity of the slot value is indicated by the time in the first information being later than the time in the second information.

* * * * *